(12) United States Patent
Luetzow

(10) Patent No.: US 6,356,076 B1
(45) Date of Patent: Mar. 12, 2002

(54) SYSTEM FOR OUTPUTTING A PLURALITY OF SIGNALS AS A COLLECTIVE REPRESENTATION OF INCREMENTAL MOVEMENTS OF AN OBJECT

(75) Inventor: Robert Herman Luetzow, Lytle, CA (US)

(73) Assignee: Optek Technology, Inc., Carrolton, TX (US)

( * ) Notice: Subject to any disclaimer, the term of this patent is extended or adjusted under 35 U.S.C. 154(b) by 0 days.

(21) Appl. No.: 09/353,852

(22) Filed: Jul. 15, 1999

(51) Int. Cl.[7] ............................. G01B 7/14; G01B 7/30
(52) U.S. Cl. ........................ 324/207.25; 324/207.21; 324/207.22; 324/207.24; 341/15
(58) Field of Search ................... 324/207.13, 207.14, 324/207.15, 207.24, 207.25, 207.21, 207.22, 174, 165, 207.2; 340/672; 341/15

(56) References Cited

U.S. PATENT DOCUMENTS

| | | | |
|---|---|---|---|
| 3,729,728 A | 4/1973 | Hardway, Jr. | 340/200 |
| 3,863,235 A | * 1/1975 | Mckee et al. | 340/195 |
| 4,058,705 A | 11/1977 | Cannon | 235/449 |
| 4,339,727 A | 7/1982 | Kage et al. | 329/106 |
| 4,914,387 A | 4/1990 | Santos | 324/166 |
| 4,970,463 A | 11/1990 | Wolf et al. | 324/207.2 |
| 5,166,611 A | 11/1992 | Kujawa et al. | 324/166 |
| 5,430,373 A | 7/1995 | Ichikawa et al. | 324/207.21 |
| 5,663,641 A | 9/1997 | Morita | 324/174 |
| 5,696,442 A | 12/1997 | Foster et al. | 324/173 |
| 5,719,496 A | 2/1998 | Wolf | 324/165 |
| 5,747,987 A | 5/1998 | Smith | 324/207.13 |
| 5,757,180 A | 5/1998 | Chou et al. | 324/207.2 |

* cited by examiner

Primary Examiner—Safet Metjahic
Assistant Examiner—Anthony Jolly
(74) Attorney, Agent, or Firm—Woodard, Emhardt, Naughton Moriarty & McNett

(57) ABSTRACT

A magnetic incremental motion detection system for outputting a plurality of voltage and/or current signals in analog or digital form wherein the voltage and/or current signals are a collective representation of any incremental rotational, linear, or pivotal movement of an object. A target of the system is adjoined to an object to synchronously move with the object. A plurality of indications are adjoined to the target, and uniformly and serially disposed along an area of a surface of the target. The system further comprises one or more magnetic sensors spatially positioned from the area of the surface to define air gap areas therebetween. Each of the magnetic sensors are operable to output at least one analog signal in response to a synchronous movement of the target with the object. The outputted analog signals have the same duty cycle, and are consistently out of phase with each other by the same degree.

15 Claims, 13 Drawing Sheets

SYSTEM FOR OUTPUTTING A PLURALITY OF SIGNALS AS A COLLECTIVE REPRESENTATION OF INCREMENTAL MOVEMENTS OF AN OBJECT

BACKGROUND OF THE INVENTION

1. Field of the Invention

The present invention relates generally to magnetic sensing systems, and more specifically, to a magnetic sensing system for outputting a plurality of voltage or current signals in analog or digital form as a collective representation of any incremental rotational, linear, or pivotal movement of an object.

2. Background

Magnetic sensors known in the art are operable to output an analog signal as a function of the magnetic flux density of any magnetic flux passing through one or more magnetic flux sensitive transducers of the magnetic sensor, e.g. a magneto-resistor, a Hall effect element, a coil, etc. The magnetic sensor is spatially positioned from an object to define an air gap area therebetween. A portion of a magnetic field traverses the air gap area, and the magnetic flux sensitive transducer(s) is (are) disposed within the magnetic field. As a result, the magnitude of the analog signal varies in response to any rotational movement, any linear movement, and/or any pivotal movement of the object that increases or decreases the reluctance across the air gap area to thereby alter the magnetic flux density of the magnetic flux passing through the magnetic flux sensitive transducer (s). Consequently, whenever any cyclical movement of the object undulates any magnetic flux passing through the magnetic flux sensitive transducer(s), each incremental movement of the object away from a reference position of the object is represented by a particular magnitude of the analog signal. Accordingly, the analog signal of a magnetic sensor has been and will continue to be extensively utilized by various electromechanical systems to ascertain a present position of the object relative to a reference position of the object.

Particularly, magnetic rotational position sensors have been extensively incorporated in engine timing systems of motor vehicles to ascertain the present rotational position of a rotary shaft relative to a reference position of the rotary shaft. Typically, the magnitude level of the analog signal is representative of a present rotational position of the rotary shaft relative to a reference position of the rotary shaft. For example, a magnitude of zero (0) volts can represent a closed position of the shaft, a magnitude of five (5) volts can represent a completely opened position of the rotary shaft that is a ninety (90) degree range of rotation from the closed position, and each magnitude of the analog signal between zero (0) volts and five (5) volts is linearly representative of a particular degree of rotation of the rotary shaft from the closed position. A computer of the motor vehicle therefore includes some form of "lookup" table to ascertain the present rotational position of the rotary shaft relative to the closed position as a function of the magnitude of the analog signal. Thus, if the computer receives the analog signal with a magnitude of 2.5 volts, the computer can ascertain that the rotary shaft is forty-five (45) degrees from the closed position based on the lookup table.

However, in some cases, it is desired to ascertain a degree of a rotational movement of a rotary shaft between two rotational positions, and in such cases, the present magnitude of the analog signal is not a representation of the degree of rotational movement of a rotary shaft between the two rotational positions. In order to ascertain the degree of rotational movement of the rotary shaft between the two rotational positions, the computer would have to be programmed to: (1) ascertain the initial rotational position of the rotary shaft relative to the reference position of the rotary shaft; (2) ascertain the present rotational position of the rotary shaft relative to the reference position of the rotary shaft; (3) determine the difference between the magnitude of the analog signal when the rotary shaft was at its initial rotational position and the present magnitude of the analog signal; and (4) ascertain the degree of movement as a function of the differences in the magnitudes. It is clear that this would require ample memory space and an appropriate clock signal to allow each of the calculations to be completed in a timely manner. However, the memory space may not be available, and/or the clock signal may be running at a frequency that will not enable the completions of the calculations in a timely manner. What is therefore needed is a simple yet quick method of ascertaining a degree of rotational, linear, or pivotal movement of an object between two positions.

SUMMARY OF THE INVENTION

The present invention overcomes the aforementioned drawback(s) associated with magnetic position sensors in ascertaining a degree of movement of an object. Various aspects of the present invention are novel, non-obvious, and provide various advantages. While the actual nature of the present invention described in detail herein can only be determined with reference to the claims appended hereto, certain features which are characteristic of the present invention disclosed herein can be described briefly.

The present invention is a magnetic incremental motion detection system for outputting a plurality of voltage and/or current signals in analog or digital form wherein the voltage and/or current signals are a collective representation of any incremental rotational, linear, or pivotal movement of an object. A target of the system is adjoined to an object to synchronously move with the object. A plurality of indications are adjoined to the target, and uniformly and serially disposed along an area of a surface of the target. One or more magnetic sensors are spatially positioned from the area of the surface to define air gap areas therebetween. Each of the magnetic sensors are operable to output an analog signal in response to a synchronous movement of the target with the object. The outputted analog signals have the same duty cycle, and are consistently out of phase with each other by the same degree.

It is a primary objective of the present invention to sense each incremental rotational, linear, or pivotal movement of an object.

It is also a primary objective of the present invention to generate one or more voltage or current signals in analog or digital form as a collective representation of each sensed incremental rotational, linear, or pivotal movement of an object.

Secondary objectives as well as advantages of the present invention will be apparent from the following description of the present invention and various embodiments thereof. dr

DESCRIPTION OF THE PREFERRED EMBODIMENT

Figure 1A:
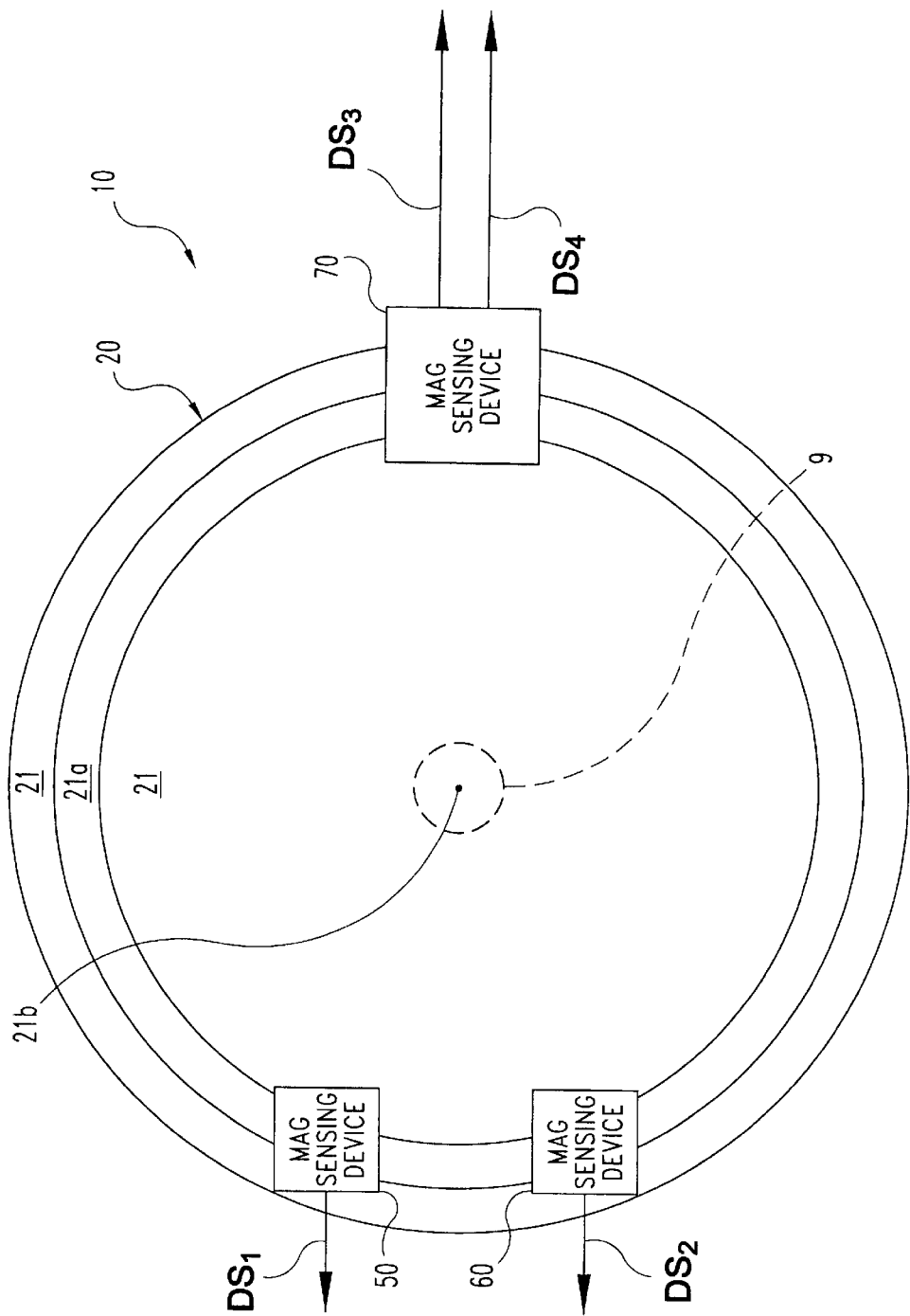
FIG. 1A is a top plan view of a magnetic incremental rotational motion detection system for incrementally detecting a rotational movement of an object in accordance with the present invention.

For the purposes of promoting an understanding of the principles of the present invention, reference will now be made to various embodiments of the present invention, particularly the preferred embodiment, as illustrated in the drawings and specific language will be used to describe the same. It will nevertheless be understood that no limitation of the scope of the claims of the present invention is thereby intended. Any alterations and further modifications in the illustrated embodiments, and any further applications of the principles of the present invention as illustrated herein are contemplated as would normally occur to one skilled in the art to which the present invention relates.

The present invention is a magnetic incremental motion detection system for outputting a plurality of voltage and/or current signals in analog or digital form wherein the voltage and/or current signals are a collective representation of any incremental rotational, linear, or pivotal movement of an object. The present invention contemplates that the object may be magnetic or ferromagnetic. The present invention further contemplates that object can have any geometric configuration and any physical dimensions.

Referring to FIG. 1A, a magnetic incremental rotational motion detection system 10 in accordance with the present invention is shown. Magnetic incremental rotational motion detection system 10 outputs a plurality of voltage and/or current signals in analog or digital form wherein the voltage and/or current signals are a collective representation of an incremental rotation of an object. Each embodiment of magnetic incremental rotational motion detection system 10 comprises a target 20. For purposes of the present invention, target 20 is defined as an article of manufacture or a combination of manufactured articles having a substantially planar surface 21 with a plurality of indications adjoined to surface 21 and serially disposed along an annular area 21a of surface 21; and an indication is defined as a hole, an indentation like a slot, a protrusion like a tooth, or an article of manufacture or combination of manufactured articles like a pole piece or a magnet. For purposes of the present invention, the adjoining of an indication to a target, e.g. target 20, is defined as an unitary fabrication, a permanent affixation, a detachable coupling, an engagement, and/or a contiguous disposal of the indication to the target by any manufacturing method.

The present invention contemplates that target 20 can be magnetic or ferromagnetic, and that indications are either magnetic or ferromagnetic. The present invention further contemplates that target 20 and the indications adjoined to surface 21 can have any geometric configuration and any physical dimensions, and that the annular area 21a can occupy any radial positions from a center 21b of surface 21. Consequently, a preferential reference of target 20 and indications adjoined to surface 21 as subsequently described herein is given solely for purposes of describing the best mode of the present invention and is not meant to be limiting to the scope of the claims in any way.

An embodiment of a magnetic incremental rotational motion detection system 10 can further comprise a magnetic sensing device 50 being operable to output a digital signal $DS_1$ as shown and a magnetic sensing device 60 being operable to output a digital signal $DS_2$ as shown, and/or a magnetic sensing device 70 being operable to output a digital signal $DS_3$ and a digital signal $DS_4$ as shown. For purposes of the present invention, a magnetic sensor is defined as any article of manufacture or any combination of manufactured articles including at least one magnetic flux sensitive transducer of any type being operable to output an analog signal as a function of the magnetic flux density of any magnetic flux passing through the magnetic flux sensitive transducer(s); a digital circuit is defined as any article of manufacture or any combination of manufactured articles operable to input an analog signal and to output a digital signal as a representation of a property of the inputted analog signal, e.g. zero crossover occurrences, peak amplitude occurrences, etc.; magnetic sensing device 50 and magnetic sensing device 60 are defined as any combination of manufactured articles including at least a magnetic sensor and a digital circuit electrically coupled to the magnetic sensor to thereby input the analog signal; and magnetic sensing device 70 is defined as any combination of manufactured articles including at least a pair of magnetic sensors, a first digital circuit electrically coupled to the first magnetic sensor to thereby input the analog signal from the first magnetic sensor, and a second digital circuit electrically coupled to the second magnetic sensor to thereby input the analog signal from the second magnetic sensor. In addition to the magnetic flux sensitive transducer(s), the present invention contemplates that a magnetic sensor may further comprise one or more pole pieces, and/or one or more magnets. Consequently, a preferential reference of a magnetic sensor as subsequently described herein is given solely for purposes of describing the best mode of the present invention and is not meant to be limiting to the scope of the claims in any way. The present invention does not contemplate any preferential embodiment of a digital circuit.

Figure 2A:
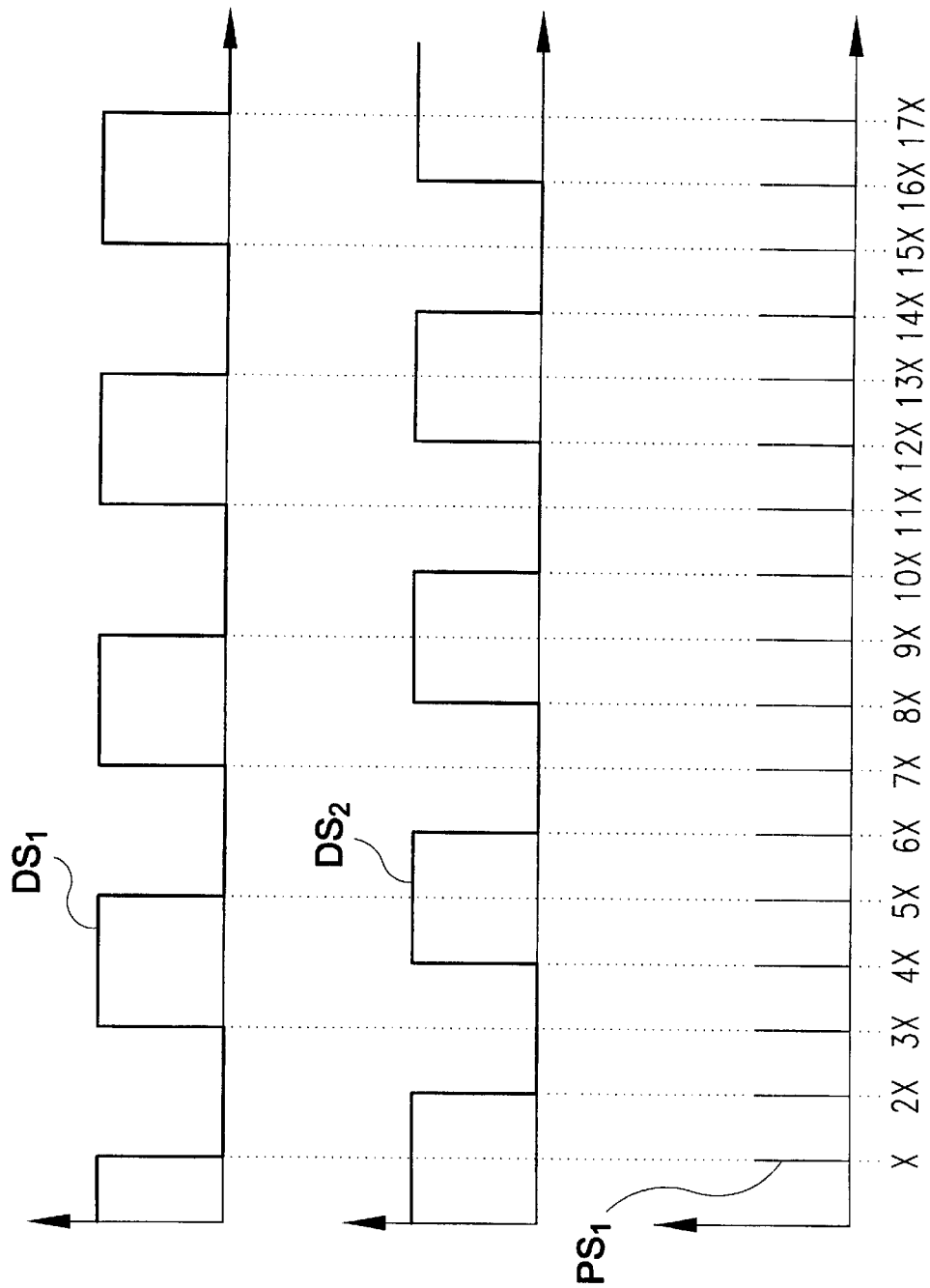
FIG. 2A is set of graphical waveforms of a pair of digital signals from either of the magnetic incremental motion detection systems of FIGS. 1A–1C, and a graphical waveform of a pulse signal as a function of the pair of digital signals.

Referring to FIGS. 1A and 2A, an example of an incremental rotational motion detection of a rotary shaft 9 by an utilization of target 20, magnetic sensing device 50, and magnetic sensing device 60 will now be described herein. Rotary shaft 9 rotates about its longitudinal axis, and target 20 is adjoined to rotary shaft 9 with the longitudinal axis of rotary shaft 9 perpendicularly intersecting center 21b whereby target 20 synchronously rotates with rotary shaft 9 about is longitudinal axis. For purposes of the present invention, an adjoining of target 20 to an object like rotary shaft 9 is broadly defined as an unitary fabrication, a permanent affixation, a detachable coupling, an engagement, and/or a contiguous disposal of target 20 to the object. Each magnetic flux sensitive transducer of magnetic sensing device 50 are spatially positioned from annular area 21a to thereby define an air gap therebetween, and each magnet flux sensitive transducer of magnetic sensing device 50 as well as any indications adjacent the magnet flux sensitive transducer(s) of magnetic sensing device 50 are disposed within a magnetic field generated by target 20, and/or a magnet or magnets of magnetic sensing device 50, if any. Each magnetic flux sensitive transducer of magnetic sensing device 60 are spatially positioned from annular area 21a to thereby define an air gap therebetween, and each magnet flux sensitive transducer of magnetic sensing device 60 as well as any indications adjacent the magnet flux sensitive transducer(s) of magnetic sensing device 60 are disposed within a magnetic field generated by target 20, and/or a magnet or magnets of magnetic sensing device 60, if any. Consequently, any synchronous rotational movement of target 20 with rotary shaft 9 will increase or decrease the reluctance across the air gaps to thereby alter the density of the magnetic flux flowing through the magnetic flux sensitive transducer(s) of both magnetic sensing device 50 and magnetic sensing device 60. To output digital signal $DS_1$ and digital signal $DS_2$ as individual representations of any synchronous rotational movement of target 20, the magnetic flux sensitive transducer(s) of magnetic sensing device 50 and magnetic sensing device 60 must be spatially positioned relative to each other whereby a magnetic flux line of the magnetic field(s) can not simultaneously intersect two magnetic flux sensitive transducer(s).

For digital signals $DS_1$ and $DS_2$ to collectively represent incremental rotational movements of rotary shaft 9, two principles of the present invention must be followed. First, the present invention contemplates that the incremental rotational movements of rotary shaft 9 can be detected in any multiples, e.g. every degree, every three (3) degrees, every ten (10) degrees, every one-tenth (1/10) of a degree, etc. Accordingly, the number of indications as well as the geometric configuration and physical dimensions of the indications must be selected whereby a common width of each indication and a common distance between indications are both a function of the desired multiple of degrees to be detected. This principle will be further illustrated in connection with FIG. 3A and described in the accompanying text. Second, the magnetic flux sensitive transducer(s) of magnetic sensing device 50 and magnetic sensing device 60 must be positioned relative to the indications and to each other whereby digital signal $DS_1$ and digital signal $DS_2$ have the same duty cycle, e.g. a 50% duty cycle as shown in FIG. 2A, and digital signal $DS_1$ and digital signal $DS_2$ are consistently out of phase by the same degree, e.g. ninety (90) degrees out of phase as shown in FIG. 2A.

A pulse waveform $PS_1$ is shown as a function of each rising edge and falling edge of digital signal $DS_1$ and digital signal $DS_2$. By adhering to the aforementioned principles, each rising edge and falling edge of digital signal $DS_1$ and digital signal $DS_2$ represents a desired multiple X of degrees to be detected, and therefore, each pulse of pulse waveform $PS_1$ is generated upon each incremental rotation of rotary shaft 9 as a function of the desired multiple X of degrees to be detected. Consequently, a computer can monitor each rising edge and falling edge of digital signal $DS_1$ and digital signal $DS_2$ to thereby ascertain each incremental rotational degree of movement of rotary shaft 9, and/or a pulse waveform like pulse waveform $PS_1$ can be inputted into an electronic device like a counter whereby the total number of incremental rotations can be ascertained. For embodiments of magnetic incremental rotational motion detection system 10 comprising magnetic sensing device 70, it is to be appreciated that the magnetic flux sensitive transducers of magnetic sensing device 70 be positioned relative to the indications and to each other whereby digital signal $DS_3$ and digital signal $DS_4$ are outputted as individual representations of any synchronous rotational movement of target 20, digital signal $DS_3$ and digital signal $DS_4$ have the same duty cycle, and digital signal $DS_3$ and digital signal $DS_4$ are consistently out of phase by the same degree.

Figure 1B:
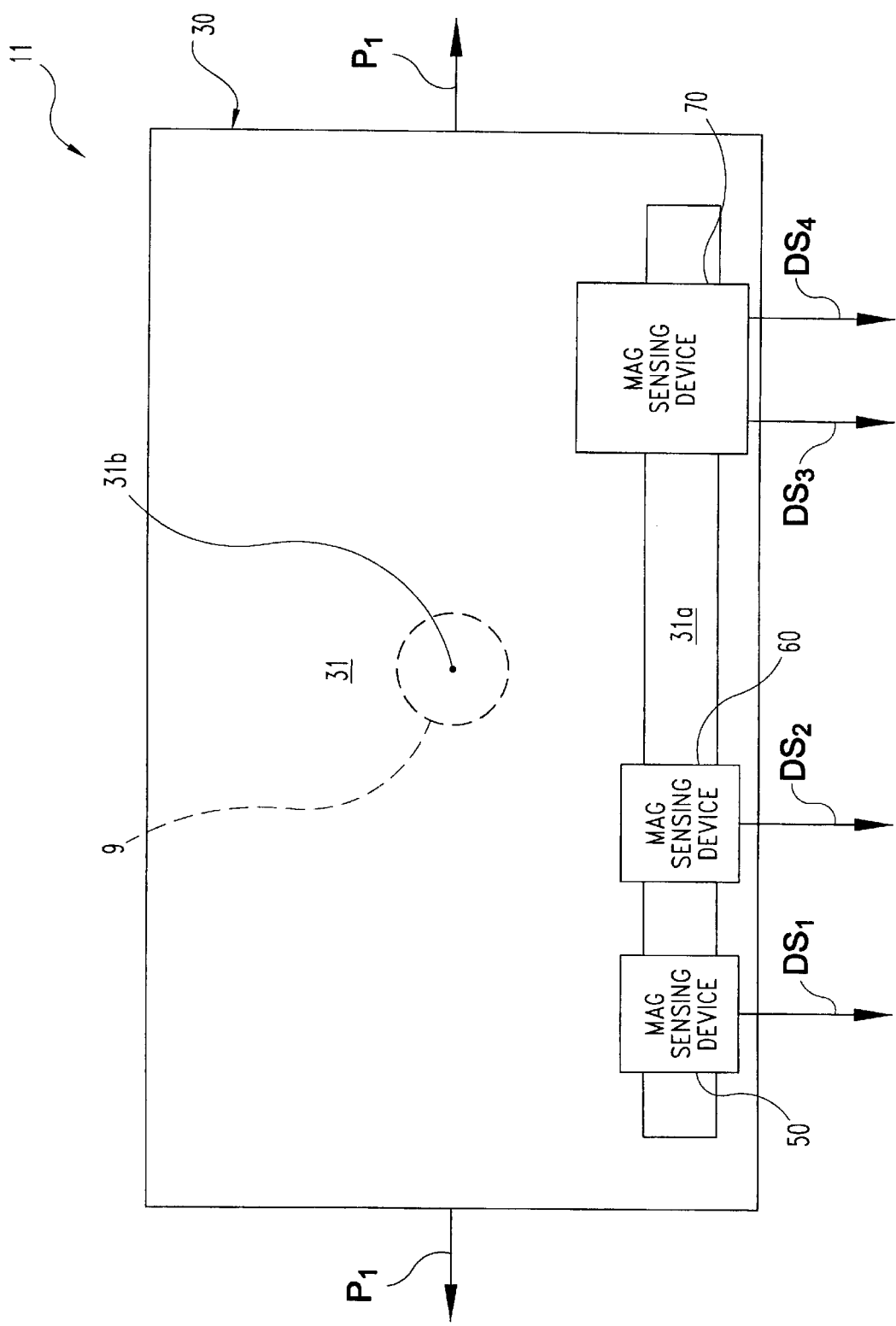
FIG. 1B is a top plan view of a magnetic incremental linear motion detection system for incrementally detecting a linear movement of an object in accordance with the present invention.

Referring to FIG. 1B, a magnetic incremental linear motion detection system 11 in accordance with the present invention is shown. Magnetic incremental linear motion detection system 11 outputs a plurality of voltage and/or current signals in analog or digital form wherein the voltage and/or current signals are a collective representation of an incremental linear displacement of an object. Each embodiment of magnetic incremental linear motion detection system 11 comprises a target 30. For purposes of the present invention, target 30 is defined as an article of manufacture or a combination of manufactured articles having a substantially planar surface 31 with a plurality of indications adjoined to surface 31 and serially disposed along a rectangular area 31a of surface 31. The present invention contemplates that target 30 can be magnetic or ferromagnetic. The present invention further contemplates that target 30 can have any geometric configuration and any physical dimensions, and that the linear region 31a can occupy any location on target surface 31. An embodiment of magnetic incremental linear motion detection system 11 can further comprise magnetic sensing device 50 as previously illustrated herein in connection with FIG. 1A and described in accompanying text, magnetic sensing device 60 as previously illustrated herein in connection with FIG. 1A and described in accompanying text, and/or magnetic sensing device 70 as previously illustrated herein in connection with FIG. 1A and described in accompanying text.

Referring to FIGS. 1B and 2A, an example of an incremental linear motion detection of a rotary shaft 9 by an utilization of target 30, magnetic sensing device 50, and magnetic sensing device 60 will now be described herein. Rotary shaft 9 is linearly displaced along a path $P_1$, and target 30 is adjoined to rotary shaft 9 with the longitudinal axis of rotary shaft 9 perpendicularly intersecting a center 31b of surface 31 to thereby synchronously linearly displace target 30 with rotary shaft 9 along path $P_1$. For purposes of the present invention, an adjoining of target 30 to an object like rotary shaft 9 is defined as an unitary fabrication, a permanent affixation, a detachable coupling, an engagement, and/or a contiguous disposal of target 30 to the object. Each magnetic flux sensitive transducer of magnetic sensing device 50 are spatially positioned from rectangular area 31a to thereby define an air gap therebetween, and each magnet flux sensitive transducer of magnetic sensing device 50 as well as any indications adjacent the magnet flux sensitive transducer(s) of magnetic sensing device 50 are disposed within a magnetic field generated by target 30, and/or a magnet or magnets of magnetic sensing device 50, if any. Each magnetic flux sensitive transducer of magnetic sensing device 60 are spatially positioned from rectangular area 31a to thereby define an air gap therebetween, and each magnet flux sensitive transducer of magnetic sensing device 60 as well as any indications adjacent the magnet flux sensitive transducer(s) of magnetic sensing device 60 are disposed within a magnetic field generated by target 30, and/or a magnet or magnets of magnetic sensing device 60, if any. Consequently, any synchronous linear displacement of target 30 with rotary shaft 9 will increase or decrease the reluctance across the air gaps to thereby alter the density of the magnetic flux flowing through the magnetic flux sensitive transducer(s) of magnetic sensing device 50 and magnetic sensing device 60. To output digital signal $DS_1$ and digital signal $DS_2$ as individual representations of any synchronous linear displacement of target 30, the magnetic flux sensitive transducer(s) of both magnetic sensing device 50 and magnetic sensing device 60 must be spatially positioned relative to each other whereby a magnetic flux line of the magnetic field(s) can not simultaneously intersect two magnetic flux sensitive transducer(s).

The present invention contemplates that the incremental linear displacements of rotary shaft 9 can be detected in any multiples, e.g. every inch, every three (3) centimeters, every ten (10) millimeters, every one-tenth (1/10) of a inch, etc. Accordingly, the number of indications as well as the geometric configuration and physical dimensions of the indications must be selected whereby a common width of each indication and a common distance between indications are both a function of the desired multiple of length to be detected. In addition, the magnetic flux sensitive transducers of magnetic sensing device 50 and magnetic sensing device 60 are positioned relative to the indications and to each other whereby digital signal $DS_1$ and digital signal $DS_2$ have a 50% duty cycle, and digital signal $DS_2$ is consistently ninety (90) degrees out of phase with digital signal $DS_1$.

Each rising edge and falling edge of digital signal $DS_1$ and digital signal $DS_2$ represents a desired multiple X of length to be detected, and therefore, each pule of pulse waveform $PS_1$ is generated upon each incremental linear displacement of rotary shaft 9 as a function of the desired multiple X of degrees to be detected. Consequently, a computer can monitor each rising edge and falling edge of digital signal $DS_1$ and digital signal $DS_2$ to thereby ascertain each incremental linear displacement of rotary shaft 9, and/or a pulse waveform like pulse waveform $PS_1$ can be inputted into an electronic device like a counter whereby the total number of incremental linear displacements can be ascertained. For embodiments of magnetic incremental linear motion detection system 11 comprising magnetic sensing device 70, it is to be appreciated that the magnetic flux sensitive transducers of magnetic sensing device 70 be positioned relative to the indications and to each other whereby digital signal $DS_3$ and digital signal $DS_4$ are outputted as individual representations of any synchronous linear displacement of target 30, digital signal $DS_3$ and digital signal $DS_4$ have the same duty cycle, and digital signal $DS_3$ and digital signal $DS_4$ are consistently out of phase by the same degree.

Figure 1C:
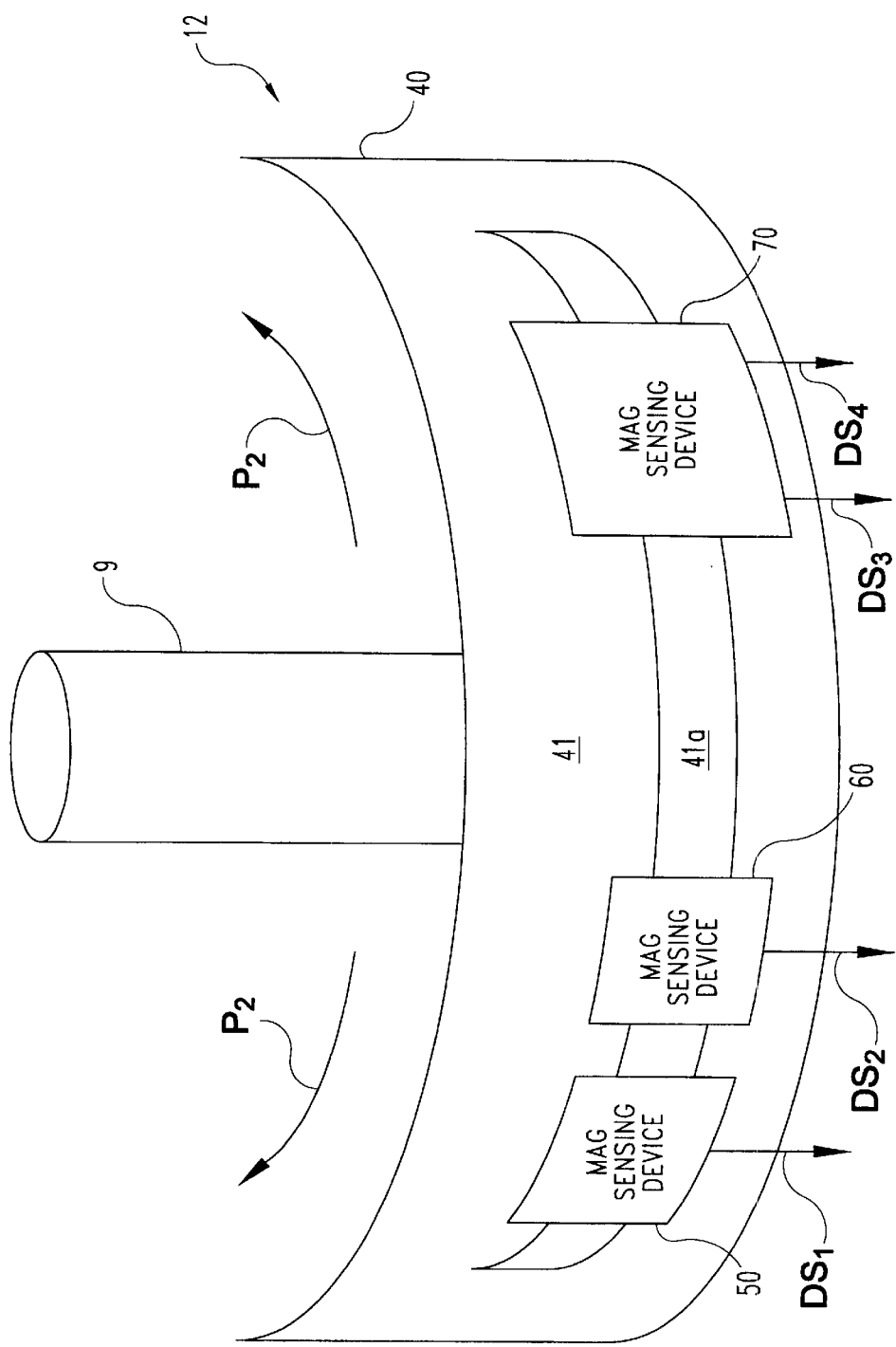
FIG. 1C is a top plan view of a magnetic incremental pivotal motion detection system for incrementally detecting a pivotal movement of an object in accordance with the present invention.

Referring to FIG. 1C, a magnetic incremental pivotal motion detection system 12 in accordance with the present invention is shown. Magnetic incremental pivotal motion detection system 12 outputs a plurality of voltage and/or current signals in analog or digital form wherein the voltage and/or current signals are a collective representation of an incremental pivotal displacements of an object. Each embodiment of magnetic incremental pivotal motion detection system 12 comprises a target 40. For purposes of the present invention, target 40 is defined as an article of manufacture or a combination of manufactured articles having a substantially planar surface 41 with a plurality of indications adjoined to surface 41 and serially disposed along an arcuate area 41a of surface 41. The present invention contemplates that target 40 can be magnetic or ferromagnetic. The present invention further contemplates that target 40 can have any geometric configuration and any physical dimensions, and that arcuate area 41a can occupy any location on target surface 41. An embodiment of magnetic incremental pivotal motion detection system 12 can further comprise magnetic sensing device 50 as previously illustrated herein in connection with FIG. 1A and described in accompanying text, magnetic sensing device 60 as previously illustrated herein in connection with FIG. 1A and described in accompanying text, and/or magnetic sensing device 70 as previously illustrated herein in connection with FIG. 1A and described in accompanying text.

Referring to FIGS. 1C and 2A, an example of an incremental pivotal motion detection of a rotary shaft 9 by an utilization of target 40, magnetic sensing device 50, and magnetic sensing device 60 will now be described herein. Rotary shaft 9 is pivotally displaced along a path $P_2$, and target 40 is adjoined to rotary shaft 9 with the longitudinal axis of rotary shaft 9 perpendicularly intersecting a side surface (not shown) of target 40 to thereby synchronously pivotally displace target 40 with rotary shaft 9 along path $P_2$. For purposes of the present invention, an adjoining of target 40 to an object like rotary shaft 9 is defined as an unitary fabrication, a permanent affixation, a detachable coupling, an engagement, and/or a contiguous disposal of target 40 to object. Each magnetic flux sensitive transducer of magnetic sensing device 50 are spatially positioned from arcuate area 41a to thereby define an air gap therebetween, and each magnet flux sensitive transducer of magnetic sensing device 50 as well as any indications adjacent the magnet flux sensitive transducer(s) of magnetic sensing device 50 are disposed within a magnetic field generated by target 40, and/or a magnet or magnets of magnetic sensing device 50, if any. Each magnetic flux sensitive transducer of magnetic sensing device 60 are spatially positioned from arcuate area 41a to thereby define an air gap therebetween, and each magnet flux sensitive transducer of magnetic sensing device 60 as well as any indications adjacent the magnet flux sensitive transducer(s) of magnetic sensing device 60 are disposed within a magnetic field generated by target 40, and/or a magnet or magnets of magnetic sensing device 60, if any. Consequently, any synchronous pivotal displacement of target 40 with rotary shaft 9 will increase or decrease the reluctance across the air gaps to thereby alter the density of the magnetic flux flowing through the magnetic flux sensitive transducer(s) of magnetic sensing device 50 and magnetic sensing device 60. To output digital signal $DS_1$ and digital signal $DS_2$ as individual representations of any synchronous pivotal displacement of target 40, the magnetic flux sensitive transducer(s) of both magnetic sensing device 50 and magnetic sensing device 60 must be spatially positioned relative to each other whereby a magnetic flux line of the magnetic field(s) can not simultaneously intersect two magnetic flux sensitive transducer(s).

The present invention contemplates that the incremental pivotal displacements of rotary shaft 9 can be detected in any multiples, e.g. every degree, every three (3) degrees, every ten (10) degrees, every one-tenth ($\frac{1}{10}$) of a degrees, etc. Accordingly, the number of indications as well as the geometric configuration and physical dimensions of the indications must be selected whereby a common width of each indication and a common distance between indications are both a function of the desired multiple of degrees to be detected. In addition, the magnetic flux sensitive transducers of magnetic sensing device 50 and magnetic sensing device 60 are positioned relative to the indications and to each other whereby digital signal $DS_1$ and digital signal $DS_2$ have a 50% duty cycle, and digital signal $DS_2$ is consistently ninety (90) degrees out of phase with digital signal $DS_1$.

Each rising edge and falling edge of digital signal $DS_1$ and digital signal $DS_2$ represents a desired multiple X of length to be detected, and therefore, each pule of pulse waveform $PS_1$ is generated upon each incremental pivotal displacement of rotary shaft 9 as a function of the desired multiple X of degrees to be detected. Consequently, a computer can monitor each rising edge and falling edge of digital signal $DS_1$ and digital signal $DS_2$ to thereby ascertain each incremental pivotal displacement of rotary shaft 9, and/or a pulse waveform like pulse waveform $PS_1$ can be inputted into an electronic device like a counter whereby the total number of incremental pivotal displacements can be ascertained. For embodiments of magnetic incremental pivotal motion detection system 12 comprising magnetic sensing device 70, it is to be appreciated that the magnetic flux sensitive transducers of magnetic sensing device 70 be positioned relative to the indications and to each other whereby digital signal $DS_3$ and digital signal $DS_4$ are outputted as individual representations of any synchronous pivotal displacement of target 40, digital signal $DS_3$ and digital signal $DS_4$ have the same duty cycle, and digital signal $DS_3$ and digital signal $DS_4$ are consistently out of phase by the same degree.

Figure 2B:
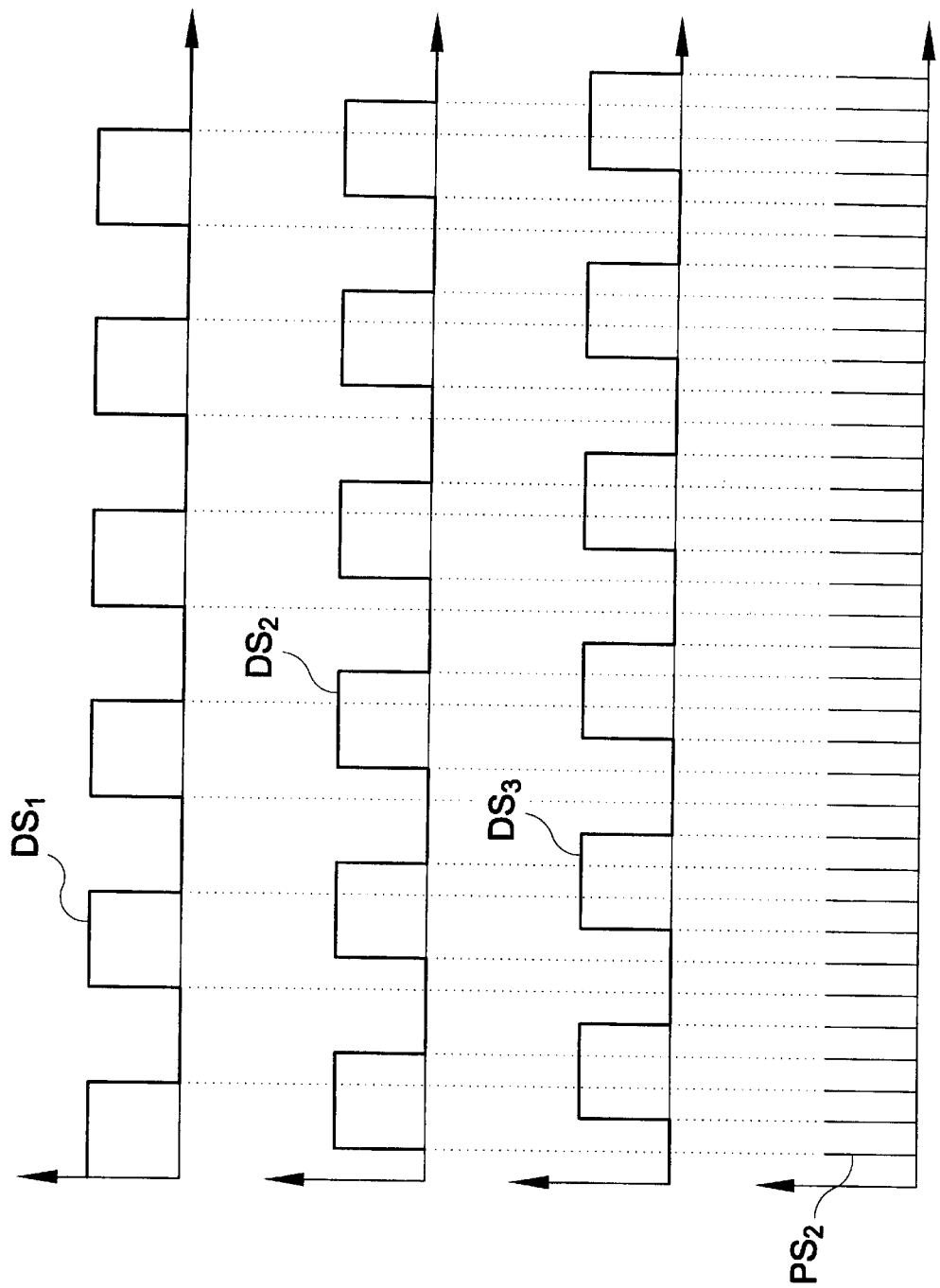
FIG. 2B is a set of a graphical waveforms of a trio of digital signals from a magnetic incremental motion detection system in accordance with the present invention, and a graphical waveform of a pulse signal as a function of the trio of digital signals.

Referring to FIG. 2B, the present invention contemplates that a magnetic incremental motion detection system, e.g. magnetic incremental rotational motion detection system 10 (FIG. 1A), can aggregately comprise three or more magnetic sensing device operable to output a digital signal. Accordingly, a pulse waveform $PS_2$ is shown as a function of digital signal $DS_1$ as outputted by magnetic sensing device 50 (FIGS. 1A–1C), digital signal $DS_2$ as outputted by magnetic sensing device 60 (FIGS. 1A–1C), and a digital signal $DS_5$ as outputted by a third magnetic sensing device. Digital signal $DS_1$, digital signal $DS_2$, and digital signal $DS_5$ all have a 50% duty cycle. Digital signal $DS_2$ is consistently sixty (60) degrees out of phase with digital signal $DS_1$, and digital signal $DS_3$ is consistently sixty (60) degrees out of phase with digital signal $DS_2$. Consequently, a greater number of pulses of pulse waveform $PS_2$ are generated over the same range of movement of an object than the generated pulses of pulse waveform $PS_1$ (FIG. 2A).

Figure 2C:
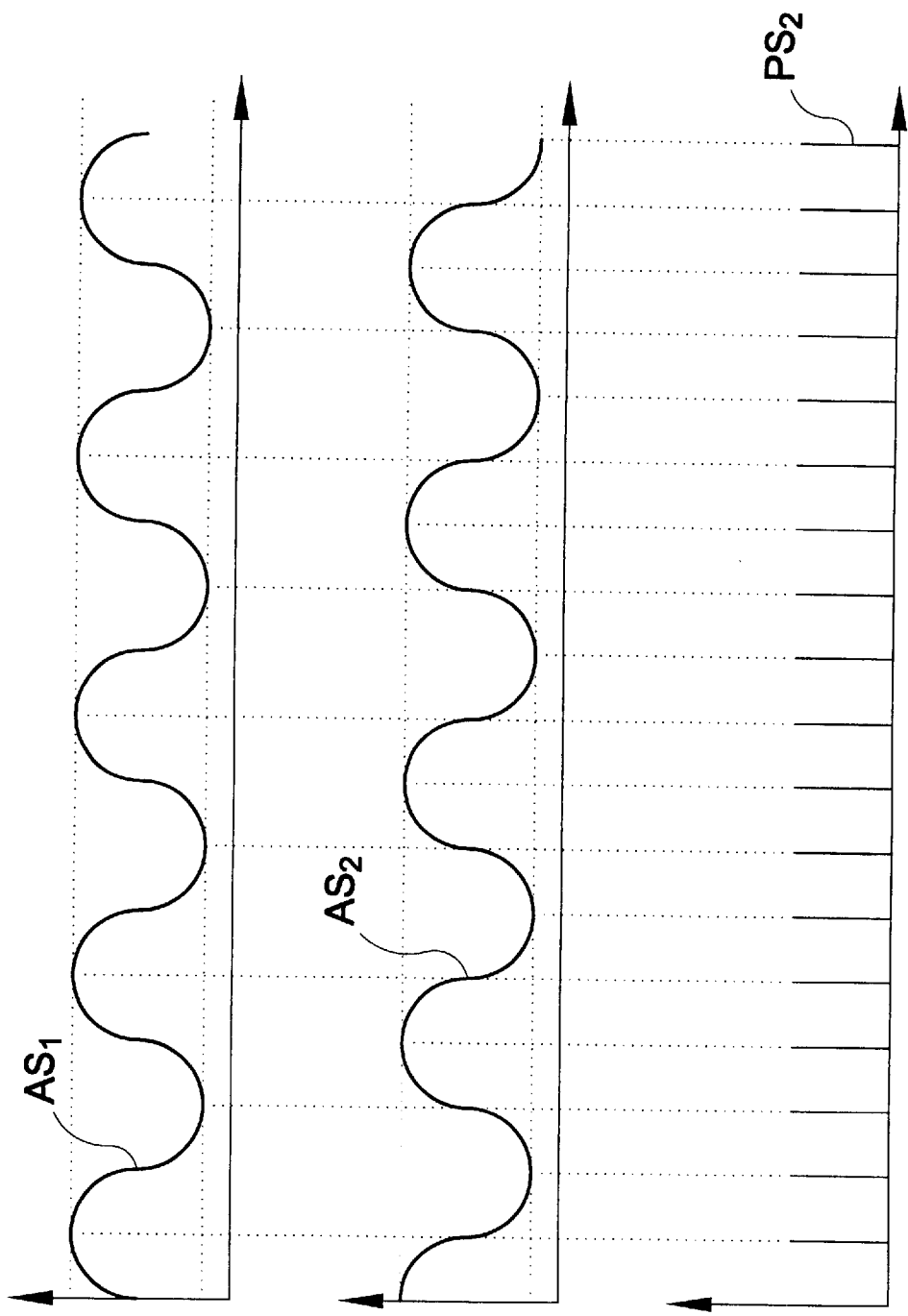
FIG. 2C is a first set of a graphical waveforms of a pair of analog signals from either of the magnetic incremental motion detection systems of FIGS. 1A–1C, and a graphical waveform of a pulse signal as a function of the pair of analog signals.
Figure 2D:
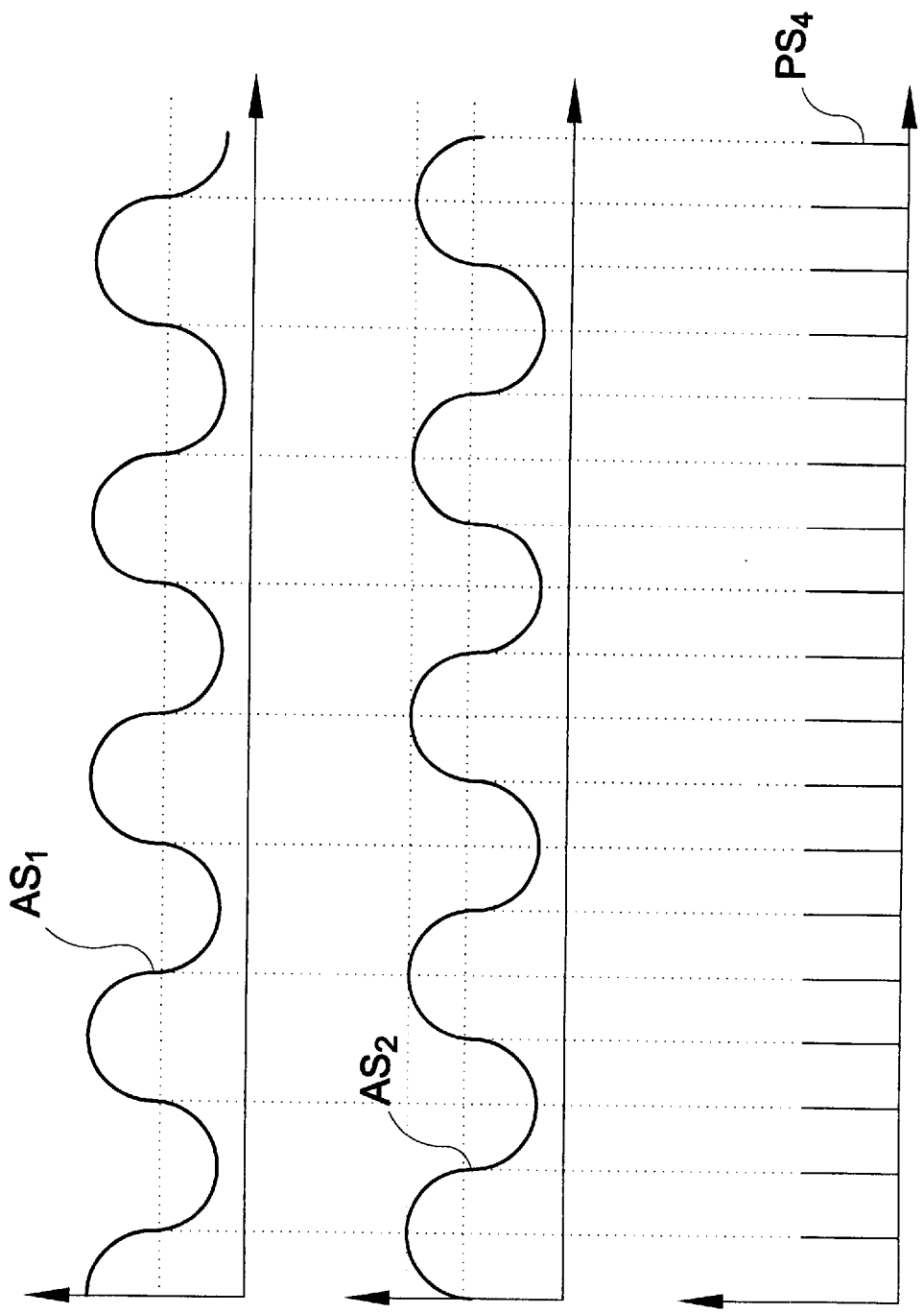
FIG. 2D is a second set of a graphical waveforms of a pair of analog signals from either of the magnetic incremental motion detection systems of FIGS. 1A–1C, and a graphical waveform of a pulse signal as a function of the pair of analog signals.

Referring to FIGS. 2C and 2D, the present invention contemplates that a magnetic incremental detection system, e.g. magnetic incremental rotational motion detection system 10 (FIG. 1A), can comprises a magnetic sensor as a substitution for a magnetic sensing device, e.g. magnetic sensing device 50 (FIGS. 1A–1C). Accordingly, a pulse waveform PS is a function of an analog signal $AS_1$ of a magnetic sensor substituting for magnetic sensing device 50, and analog signal $AS_2$ of a magnetic sensor substituting for magnetic sensing device 60 (FIGS. 1A–1C). In FIG. 2C, each pulse of a pulse waveform $PS_3$ is generated upon $AS_1$ reaching one of its peak amplitudes, and analog signal $AS_2$ reaching one of its peak amplitudes. In FIG. 2D, each pulse of a pulse waveform $PS_4$ is generated upon $AS_1$ crossing over a reference level RL, and analog signal $AS_2$ crossing over reference level RL. The present invention further contemplates that a magnetic incremental detection system, e.g. magnetic incremental rotational motion detection system 10 (FIG. 1A), can aggregately comprise three or more magnetic sensors.

Figure 3A:
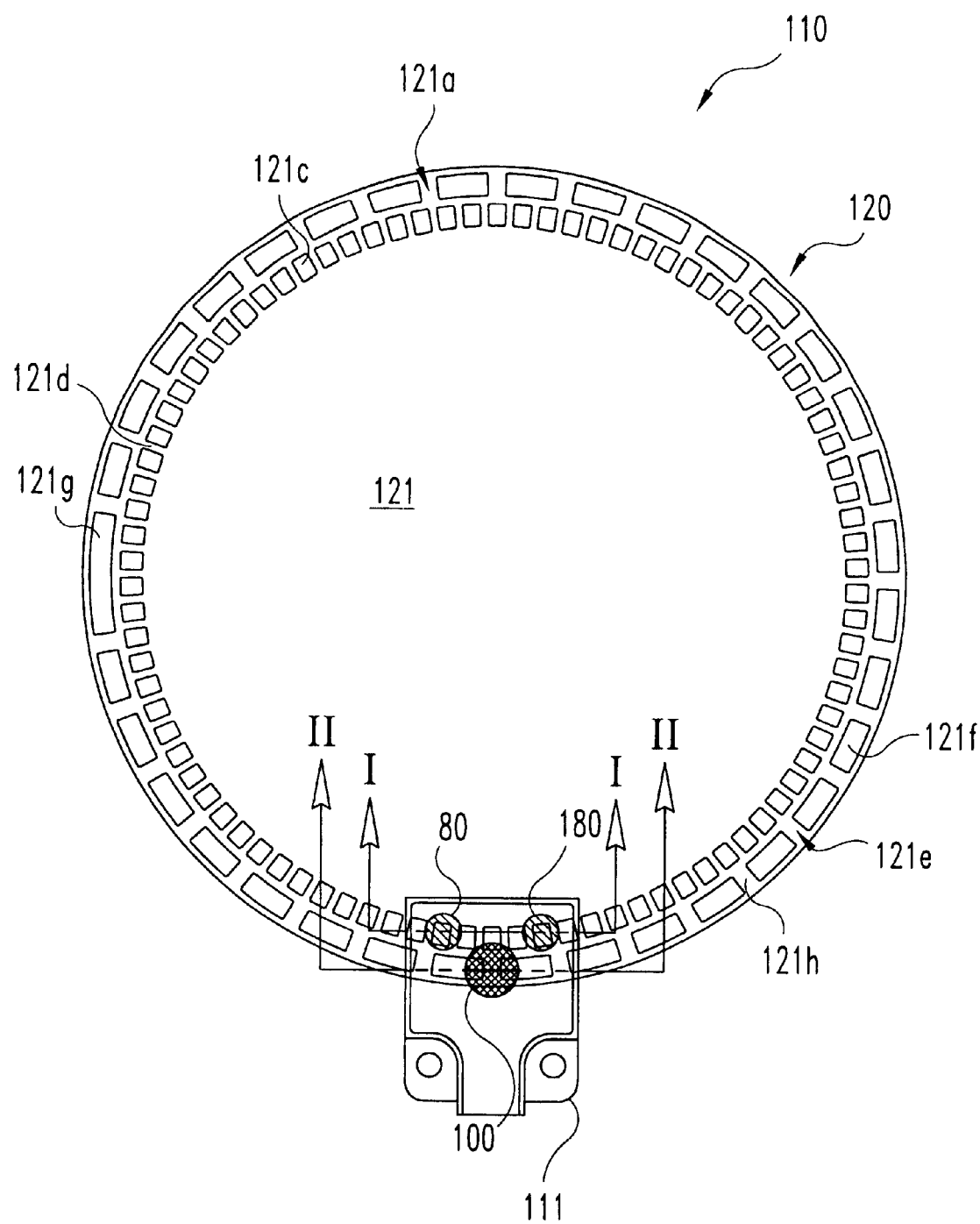
FIG. 3A is a bottom plan view of a preferred embodiment of the magnetic incremental rotational motion detection system of FIG. 1A.

Referring to FIG. 3A, a magnetic incremental rotational motion detection system 110 as one embodiment of magnetic incremental rotational motion detection system 10 (FIG. 1A) is shown. Magnetic incremental rotational motion detection system 110 comprises a target wheel 120. Target wheel 120 has a planar annular surface 121 with ninety (90) rectangular holes 121c disposed therethrough, and uniformly and serially spaced along an annular area 121a to thereby define ninety (90) ribs 121d whereby a width of each hole 121a is identical and a width of each rib 121d is identical. Preferably, target wheel 120 is ferromagnetic the diameter of target wheel 120 is between six (6) and ten (10) inches, a width of each slot 121c is approximately 2.62 degrees, and a width of each rib 121d is 1.38 degrees. Magnetic incremental rotational motion detection system 110 further comprises a magneto-resistive sensor 80 and a magneto-resistive sensor 180. For purposes of the present invention, magneto-resistive sensor 80 and magneto-resistive sensor 180 are defined as any combination of manufactured articles including at least one magneto-resistor in series between an input terminal and a reference terminal, and electrically coupled to an output terminal to thereby output an analog signal, e.g. analog signal $AS_1$ (FIGS. 2C and 2D), in response to a magnetic flux density of any magnetic flux flowing through the magneto-resistor (s).

Figure 3B:
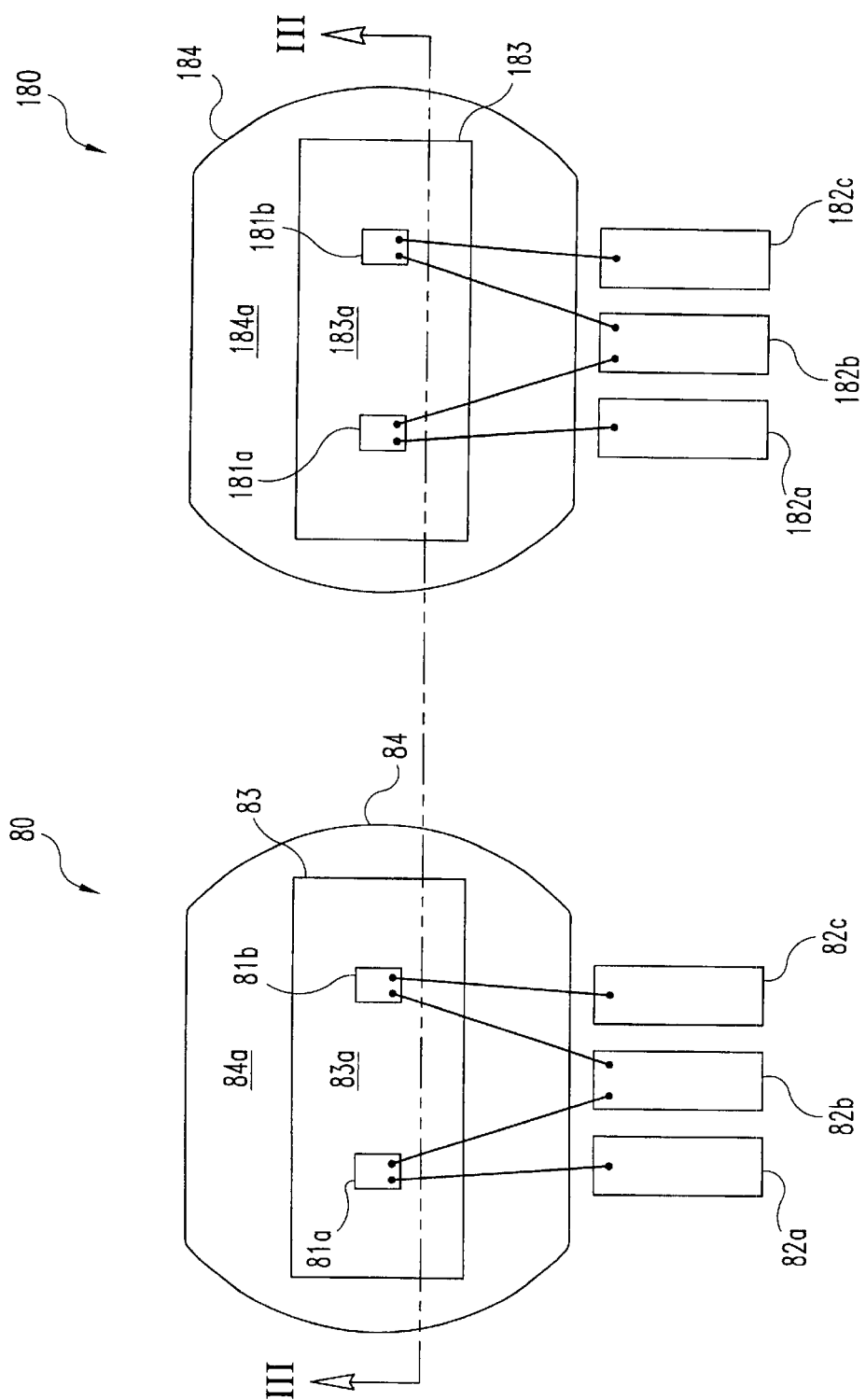
FIG. 3B are top plan views of an embodiment of a pair of magneto-resistive sensors of FIG. 3A.
Figure 3C:
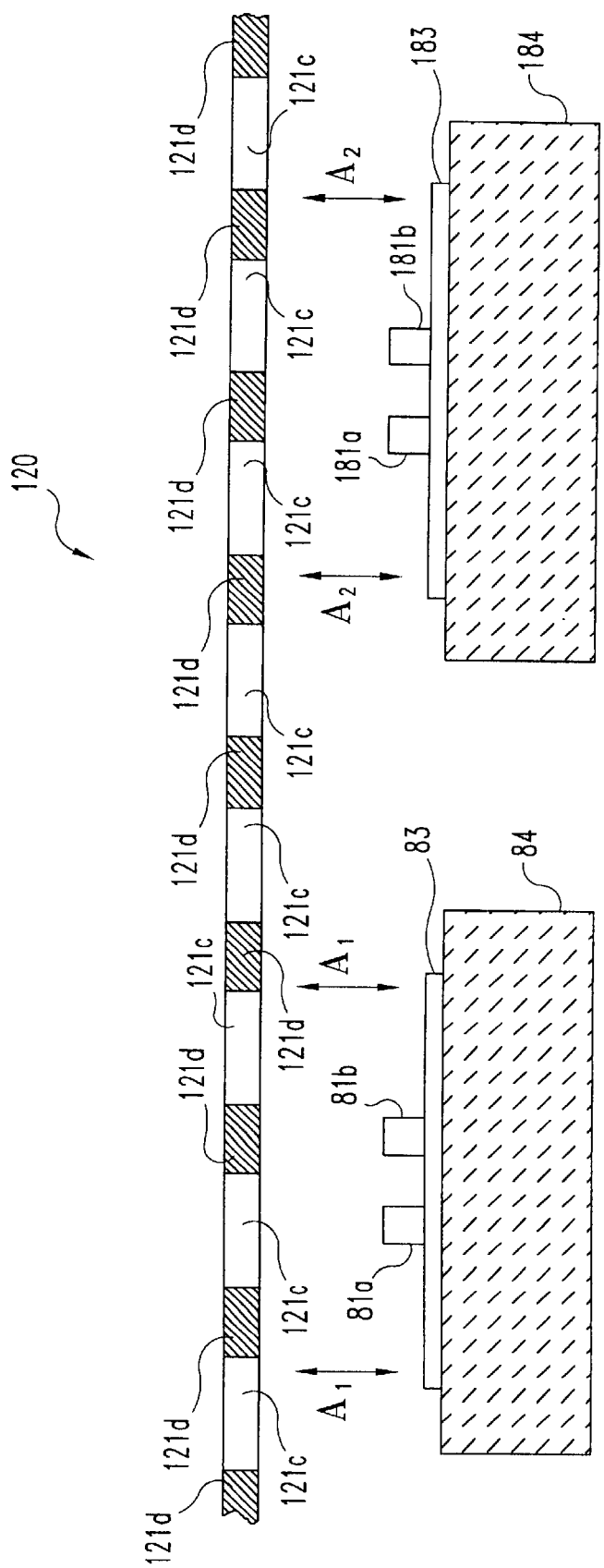
FIG. 3C are cross-sectional side views of the magneto-resistive sensors of FIG. 3B taken along line III—III as spatially positioned from a cross-sectional side view of a target wheel of FIG. 3A taken along line I—I.

Referring to FIGS. 3B and 3C, magneto-resistive sensor 80 includes a magneto-resistor element 81a, a magneto-resistor 81b, a contact 82a as an input terminal, a contact 82b as an output terminal, a contact 82c as a reference terminal, a conductive layer 83, and a magnet 84. Magneto-resistor 81a and magneto-resistor 81b are disposed on surface 83a of conductive layer 83, and conductive layer 83 is disposed one a pole surface 84a, north or south, of magnet 84. Preferably, pole surface 84a is a north pole surface of magnet 84. Magneto-resistor 81a and magneto-resistor 81b are spatially positioned from target wheel 120 to define an air gap area $A_1$ therebetween whereby a magnetic field (not shown) as generated by magnet 84 traverses air gap area $A_1$. Magneto-resistor 81a is electrically coupled to contact 82a and to contact 82b, and magneto-resistor 81b is electrically coupled to contact 82b and to contact 82c to thereby output an analog signal from contact 82b when a power source is electrically coupled to contact 82a and a common reference is electrically coupled to contact 82c. Preferably, magneto-resistor 81a and magneto-resistor 81b are made from the same die with the same dimensions; magneto-resistor 81a and magneto-resistor 81b are spaced by a 0.559 magnetic wavelength; and air gap area $A_1$ varies if at all between 0.5 millimeters and two (2) millimeters to thereby output the analog signal as analog signal $AS_1$ (FIGS. 2C and 2D). Incremental rotational motion detection system 110 can further comprises a digital circuit (not shown) electrically coupled to contract 82b to thereby input analog signal $AS_1$ whereby the digital circuit can output digital signal $DS_1$ (FIGS. 2A and 2B).

Magneto-resistive sensor 180 includes a magneto-resistor element 181a, a magneto-resistor 181b, a contact 182a as an input terminal, a contact 182b as an output terminal, a contact 182c as a reference terminal, a conductive layer 183, and a magnet 184. Magneto-resistor 181a and magneto-resistor 181b are disposed on surface 183a of conductive layer 183, and conductive layer 183 is disposed one a pole surface 184a, north or south, of magnet 184. Preferably, pole surface 184a is a north pole surface of magnet 184. Magneto-resistor 181a and magneto-resistor 181b are spatially positioned from target wheel 120 to define an air gap area $A_2$ therebetween whereby a magnetic field (not shown) as generated by magnet 184 traverses air gap area $A_2$. Magneto-resistor 181a is electrically coupled to contact 182a and to contact 182b, and magneto-resistor 181b is electrically coupled to contact 182b and to contact 182c to thereby output an analog signal from contact 182b when a power source is electrically coupled to contact 182a and a common reference is electrically coupled to contact 182c. Preferably, magneto-resistor 181a and magneto-resistor 181b are made from the same die with the same dimensions; magneto-resistor 181a and magneto-resistor 181b are spaced by a 0.559 magnetic wavelength; magnet 84 and magnet 184 are sufficiently spaced to prevent any magnetic interaction between magnet 84 and magnet 184; and air gap area $A_2$ varies if at all between 0.5 millimeters and two (2) millimeters to thereby output the analog signal as analog signal $AS_2$ (FIGS. 2C and 2D). Incremental rotational motion detection system 110 can further comprises a digital circuit (not shown) electrically coupled to contract 182b to thereby input analog signal $AS_2$ whereby the digital circuit can output digital signal $DS_2$ (FIGS. 2A and 2B).

Figure 3D:
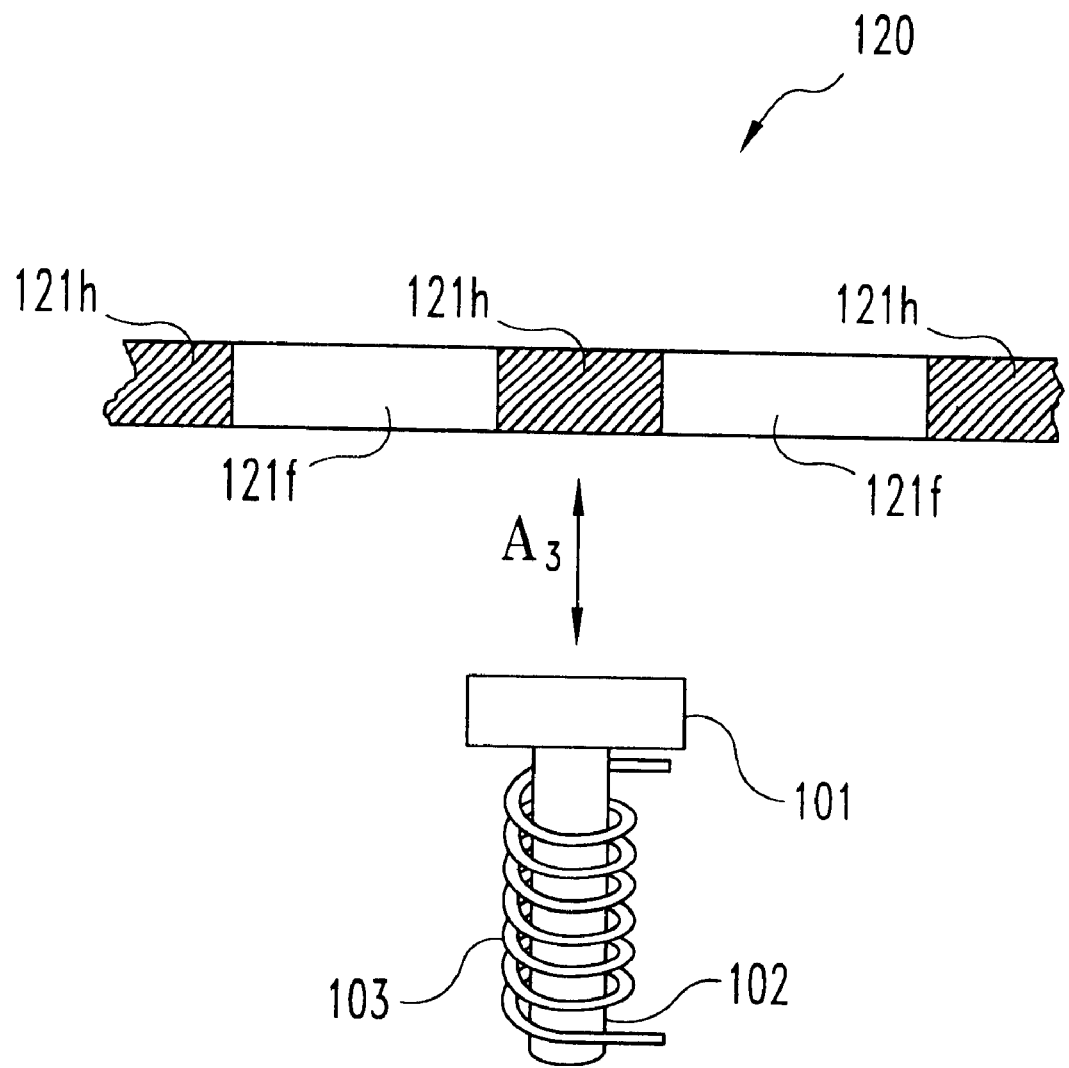
FIG. 3D is a side view of a variable-reluctance sensor of FIG. 3A as spatially positioned from a cross-sectional side view of the target wheel of FIG. 3A taken along line II—II.

Referring to FIGS. 3A and 3D, incremental rotational motion detection system 110 optionally comprises a variable-reluctance sensor 100. For purposes of the present invention, variable-reluctance sensor 100 is defined as any combination of manufactured articles including a coil having a pair of terminals to thereby generate and output an analog signal as a function of a variant in a magnetic flux density of any magnetic flux flowing through coil. The present invention contemplates the variable-reluctance sensor may or may not have one or more pole pieces, and/or one or more magnets. Preferably, variable-reluctance sensor 100 includes a magnet 101 having one of its pole surface spatially positioned from an annular area 121e of surface 121 to define an air gap area $A_3$ therebetween whereby a magnetic field (not shown) generated by magnet 101 traverses air gap area $A_3$, a pole piece 102 adjacently disposed with the other pole surface of magnet 101, and a coil 103 disposed around the pole piece 102 to thereby generate an analog signal. It is further preferred that the north pole surface of magnet 84 (FIGS. 3B and 3C), the north pole surface of magnet 184 (FIGS. 3B and 3C), and the north pole surface of magnet 101 are facing target wheel 120 to thereby allow magneto-resistive sensor 80, magneto-resistor sensor 180, and variable reluctance sensor 100 to be adjacently disposed within a housing 111.

When magnetic incremental rotational motion detection system 110 comprises variable-reluctance sensor 100 as shown, surface 121 preferably has thirty-four (34) rectangular holes 121f disposed therethrough, and uniformly and serially spaced along annular area 121e, and a rectangular hole 121g disposed therethrough and uniformly spaced between two holes 121f to thereby define thirty-five (35) ribs 121h whereby a width of each hole 121f is identical, a width of each rib 121h is identical, and a width of hole 121g is slightly greater than twice the width of a hole 121f. The present invention contemplates that annular area 121e can be located at radial positions from a center 121b of surface 121 that are greater than the radial positions of annular area 121a from center 121b as shown, or less than the radial positions of annular area 121a from center 121b. A width of magnet 100 is no greater than the width of holes 121f. Preferably, the width of magnet 100 is identical the width of holes 121f as shown whereby coil 103 will generate and output an analog signal as a sine wave in response to an synchronous rotation of target wheel 120 with an object, e.g. rotary shaft 9, when magnet 100 is facing a portion of a hole 121f or a rib 121h, and coil 103 will not generate and output the analog signal when magnet 100 is completely facing hole 121g. This is beneficial because magneto-resistor 80 and magneto-resistor 180 can be utilized in an engine timing of an electric motor, and variable-reluctance sensor 100 can be utilized in an ignition timing of the electric motor while the three (3) sensor are adjacently disposed within housing 111. In addition, target wheel 120 can be disposed between the three sensors and a magnetic interference generating device, e.g. an open frame electric motor, whereby target wheel 120 will serve as a shielding device that prevents an interference by any electrical or magnetic noise from magnetic interference generating device with the outputting of the analog signals from the three magnetic sensors.

Incremental rotational motion detection system 110 can further comprise a digital circuit (not shown) electrically coupled to contract 82b to thereby input analog signal $AS_1$ whereby the digital circuit can output digital signal $DS_1$ (FIGS. 2A and 2B), and a digital circuit (not shown) electrically coupled to contract 82e to thereby input analog signal $AS_2$ whereby the digital circuit can output digital signal $DS_2$ (FIGS. 2A and 2B).

Figure 4A:
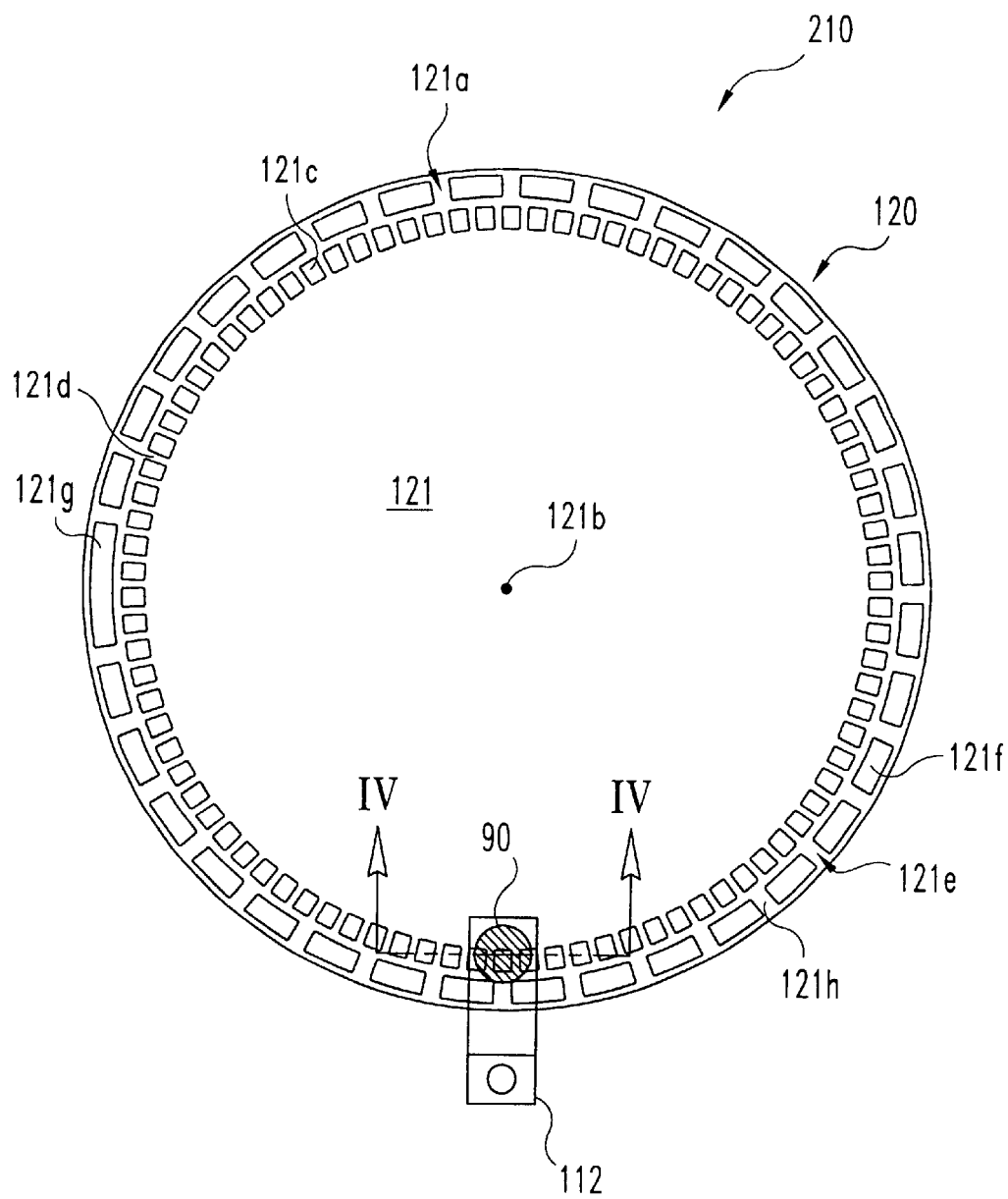
FIG. 4A is a bottom plan view of a second embodiment of the magnetic incremental rotational motion detection system of FIG. 1A.

Referring to FIG. 4A, a magnetic incremental rotational motion detection system 210 as an another embodiment of magnetic incremental rotational motion detection system 10 (FIG. 1A) is shown. Magnetic incremental rotational motion detection system 210 comprises target wheel 120 as previously illustrated herein in connection with FIG. 3A and described in the accompanying text. Magnetic incremental rotational motion detection system 110 further comprises a magneto-resistive sensor 90. For purposes of the present invention, magneto-resistive sensor 90 is defined as any combination of manufactured articles including a first set of at least one magneto-resistor in series between a first input terminal and a first reference terminal, and electrically coupled to a first output terminal to thereby output a first analog signal, e.g. analog signal $AS_1$ (FIGS. 2C and 2D), as a function of a magnetic flux density of any magnetic flux flowing through the first set of at least one magneto-resistor (s), and further including a second set of at least one magneto-resistor in series between a second input terminal and a second reference terminal, and electrically coupled to a second output terminal to thereby output a second analog signal, e.g. analog signal $AS_2$ (FIGS. 2C and 2D), as a function of a magnetic flux density of any magnetic flux flowing through the second set of at least one magneto-resistor(s).

Figure 4B:
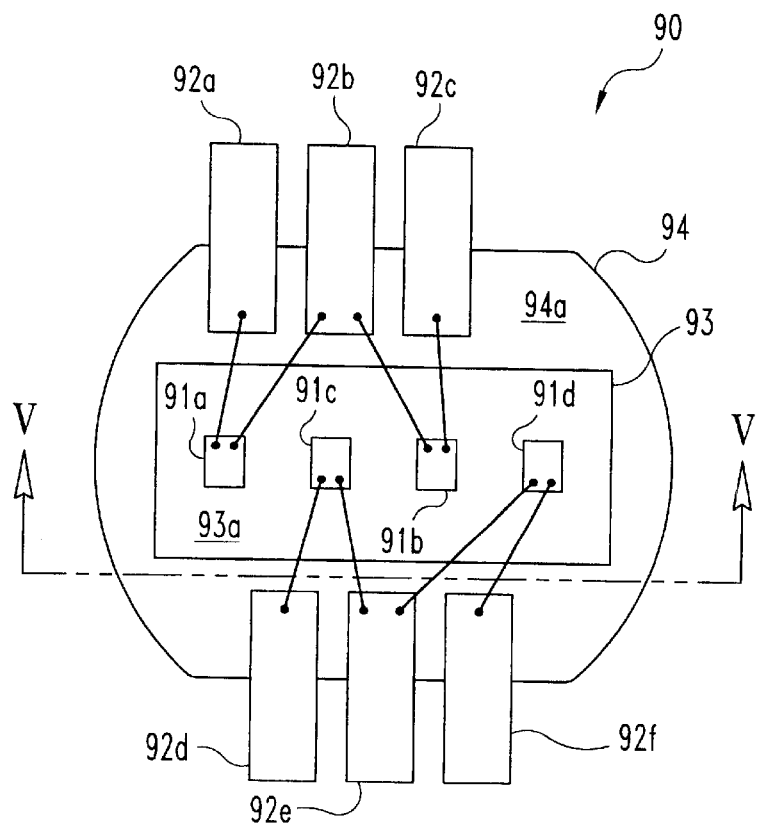
FIG. 4B is a top plan view of an embodiment of a magneto-resistive sensor of FIG. 4A.
Figure 4C:
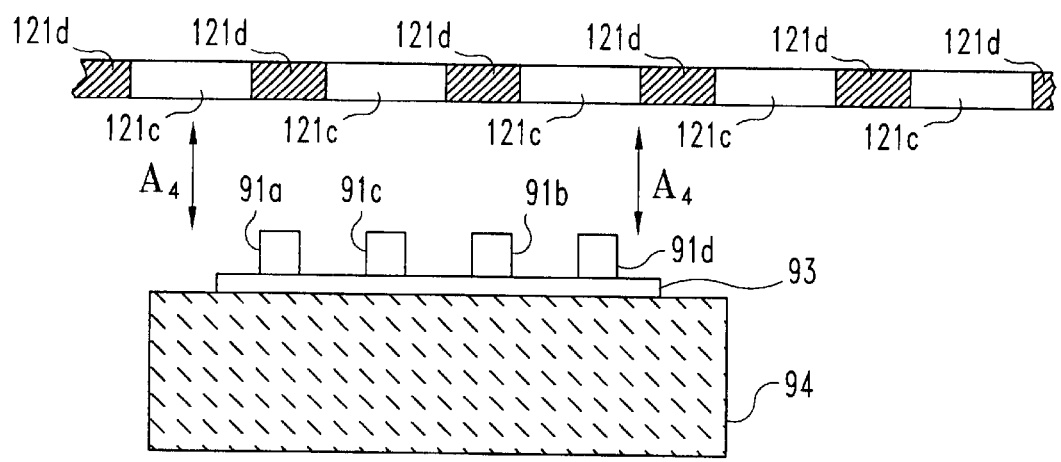
FIG. 4C is a cross-sectional side view of the magneto-resistive sensor of FIG. 4B taken along line V—V as spatially positioned from a cross-sectional view of a target wheel of FIG. 4A taken along line IV—IV.

Referring to FIGS. 4B and 4C, magneto-resistive sensor 90 includes a magneto-resistor element 91a, a magneto-resistor 91b, a magneto-resistor element 91c, a magneto-resistor 91d, a contact 92a as an input terminal, a contact 92b as an output terminal, a contact 92c as a reference terminal, a contact 92d as an input terminal, a contact 92e as an output terminal, a contact 92f as a reference terminal, a conductive layer 93, and a magnet 94. Magneto-resistor 91a, magneto-resistor 91b, magneto-resistor 91c, and magneto-resistor 91d are disposed on surface 93a of conductive layer 93, and conductive layer 93 is disposed one a pole surface 94a, north or south, of magnet 94. Preferably, pole surface 94a is a north pole surface of magnet 94. Magneto-resistor 91a, magneto-resistor 91b, magneto-resistor 91c, and magneto-resistor 91d are spatially positioned from target wheel 120 to define an air gap area $A_4$ therebetween whereby a magnetic field (not shown) as generated by magnet 94 traverses air gap area $A_4$. Magneto-resistor 91a is electrically coupled to contact 92a and to contact 92b, and magneto-resistor 91b is electrically coupled to contact 92b and to contact 92c to thereby output an analog signal from contact 92b when a power source is electrically coupled to contact 92a and a common reference is electrically coupled to contact 92c. Magneto-resistor 91c is electrically coupled to contact 92d and to contact 92e, and magneto-resistor 91d is electrically coupled to contact 92e and to contact 92f to thereby output an analog signal from contact 92e when a power source is electrically coupled to contact 92d and a common reference is electrically coupled to contact 92f.

Preferably, magneto-resistor 91a, magneto-resistor 91b, magneto-resistor 91c, and magneto-resistor 91d are made from the same die with the same dimensions; magneto-resistor 91a and magneto-resistor 91c are spaced by a 0.279 magnetic wavelength; magneto-resistor 91b and magneto-resistor 91c are spaced by a 0.559 magnetic wavelength; magneto-resistor 91b and magneto-resistor 91d are spaced by a 0.279 magnetic wavelength; and air gap area $A_4$ varies if at all between 0.5 millimeters and two (2) millimeters to thereby output the analog signal from contact 92b as analog signal $AS_1$ (FIGS. 2C and 2D) and output the analog signal from contact 92e as analog signal $AS_2$ (FIGS. 2C and 2D).

Incremental rotational motion detection system 210 can further comprise a digital circuit (not shown) electrically coupled to contract 182b to thereby input analog signal $AS_1$ whereby the digital circuit can output digital signal $DS_1$ (FIGS. 2A and 2B), and a digital circuit (not shown) electrically coupled to contract 182e to thereby input analog signal $AS_2$ whereby the digital circuit can output digital signal $DS_2$ (FIGS. 2A and 2B). Incremental rotational motion detection system 210 can further comprise variable-reluctance sensor 100 (FIG. 3A) adjacently disposed within a housing 112, and consequently target wheel 120 would therefore include holes 121f, hole 121g, and rib 121h disposed along annular area 121e as shown.

While the present invention has been illustrated and described in detail in the drawings and foregoing description, the same is to be considered as illustrative and not restrictive in character, it being understood that the preferred embodiment has been shown and described and that all changes and modifications that come within the spirit of the invention are desired to be protected.

What is claimed is:

1. A magnetic incremental motion detection system for outputting a plurality of signals as a collective representation of an incremental movement of an object, said magnetic incremental motion detection system comprising:

a target having a surface, said target adjoined to the object to thereby synchronously move with the object;

a first set of indications adjoined to said surface of said target, said first set of indications being serially and uniformly disposed along a first area of said surface, said first set of indications having identical widths;

a first magnetic sensor spatially positioned from said first area of said surface to thereby define a first air gap area therebetween, said first magnetic sensor being operable to output a first analog signal having a first duty cycle in response to a synchronous movement of said target with the object;

a second magnetic sensor spatially positioned from said first area of said surface to thereby define a second air gap area therebetween, said second magnetic sensor being operable to output a second analog signal having a second duty cycle in response to said synchronous movement of said target with the object, wherein said first duty cycle and said second duty cycle are identical, and wherein said second analog signal is consistently out of phase by a same degree with said first analog signal; and a third magnetic sensor spatially positioned from said first area of said surface to thereby define a third air gap area therebetween, said third magnetic sensor being operable to output a third analog signal having a third duty cycle in response to a synchronous movement of said target with the object, wherein said third duty cycle is identical to said first duty cycle and to said second duty cycle.

2. A magnetic incremental motion detection system for outputting a plurality of signals as a collective representation of an incremental movement of an object, said magnetic incremental motion detection system comprising:

a target having a surface, said target adjoined to the object to thereby synchronously move with the object;

a first set of indications adjoined to said surface of said target, said first set of indications being serially and uniformly disposed along a first area of said surface, said first set of indications having identical widths;

a first magnetic sensor spatially positioned from said first area of said surface to thereby define a first air gap area therebetween, said first magnetic sensor being operable to output a first analog signal having a first duty cycle in response to a synchronous movement of said target with the object;

a second magnetic sensor spatially positioned from said first area of said surface to thereby define a second air gap area therebetween, said second magnetic sensor being operable to output a second analog signal having a second duty cycle in response to said synchronous movement of said target with the object, wherein said first duty cycle and said second duty cycle are identical, and wherein said second analog signal is consistently out of phase by a same degree with said first analog signal, a second set of indications adjoined to said surface of said target, said second set of indications being serially and uniformly disposed along a second area of said surface, a second set of indications having identical widths;

a third indication adjoined to said surface, said third indication being disposed along a second area of said surface among said second set of indications, said third indication having a width that is greater than said widths of said second set of indications; and a third magnetic sensor spatially positioned from said second area of said surface to thereby define a third air gap area therebetween, said at least one magnetic flux sensitive transducer of said third magnetic sensor being operable to output a third analog signal in response to a synchronous movement of said target with the object.

3. The magnetic incremental motion detection system of claim 2 further comprising a housing wherein said first magnetic sensor, said second magnetic sensor, and said third magnetic sensor are adjacently disposed therein.

4. A magnetic incremental motion detection system for outputting a plurality of signals as a collective representation of an incremental movement of an object, said magnetic incremental motion detection system comprising:

a target having a surface, said target adjoined to the object to thereby synchronously move with the object;

a first set of indications adjoined to said surface of said target, said first set of indications being serially and uniformly disposed along a first area of said surface, said first set of indications having identical widths;

a first magnetic sensor spatially positioned from said first area of said surface to thereby define a first air gap area therebetween, said first magnetic sensor being operable to output a first analog signal having a first duty cycle in response to a synchronous movement of said target with the object, said first magnetic sensor being further operable to output a second analog signal having a second duty cycle in response to said synchronous movement of said target with the object, wherein said first duty cycle and said second duty cycle are identical, and wherein said second analog signal is consistently out of phase by a same degree with said first analog signal;

a first digital circuit electrically coupled to said first magnetic sensor to thereby input said first analog signal, said first digital circuit being operable to output a first digital signal having said first duty cycle in response to said first analog signal; and a second digital circuit electrically coupled to said first magnetic sensor to thereby input said second analog signal, said second digital circuit being operable to output a second digital signal having said second duty cycle in response to said second analog signal whereby said first digital circuit, said second digital circuit, and said first magnetic sensor constitute a magnetic sensing device, wherein said second digital signal is consistently out of phase by said same degree with said first digital signal.

5. A magnetic incremental motion detection system for outputting a plurality of signals as a collective representation of an incremental movement of an object, said magnetic incremental motion detection system comprising:

a target having a surface, said target adjoined to the object to thereby synchronously move with the object;

a first set of indications adjoined to said surface of said target, said first set of indications being serially and uniformly disposed along a first area of said surface, said first set of indications having identical widths;

a first magnetic sensor spatially positioned from said first area of said surface to thereby define a first air gap area therebetween, said first magnetic sensor being operable to output a first analog signal having a first duty cycle in response to a synchronous movement of said target with the object, said first magnetic sensor being further operable to output a second analog signal having a second duty cycle in response to said synchronous movement of said target with the object, wherein said first duty cycle and said second duty cycle are identical, and wherein said second analog signal is consistently out of phase by a same degree with said first analog signal; and a second magnetic sensor spatially positioned from said first area of said surface to thereby define a second air gap area therebetween, said second magnetic sensor being operable to output a third analog signal having a third duty cycle in response to a synchronous movement of said target with the object, wherein said third duty cycle is identical to said first duty cycle and to said second duty cycle, and wherein said third digital signal is consistently out of phase by said same degree with said second digital signal.

6. A magnetic incremental motion detection system for outputting a plurality of signals as a collective representation of an incremental movement of an object, said magnetic incremental motion detection system comprising:

a target having a surface, said target adjoined to the object to thereby synchronously move with the object;

a first set of indications adjoined to said surface of said target, said first set of indications being serially and uniformly disposed along a first area of said surface, said first set of indications having identical widths;

a first magnetic sensor spatially positioned from said first area of said surface to thereby define a first air gap area therebetween, said first magnetic sensor being operable to output a first analog signal having a first duty cycle in response to a synchronous movement of said target with the object, said first magnetic sensor being further operable to output a second analog signal having a second duty cycle in response to said synchronous movement of said target with the object, wherein said first duty cycle and said second duty cycle are identical, and wherein said second analog signal is consistently out of phase by a same degree with said first analog signal;

a second set of indications adjoined to said surface, said second set of indications being serially and uniformly disposed along a second area of said surface, a second set of indications having identical widths;

a third indication adjoined to said surface, said third indication being disposed along a second area of said surface among said second set of indications, said third indication having a width that is greater than said widths of said second set of indications; and a second magnetic sensor spatially positioned from said second area of said surface to thereby define a second air gap therebetween, said second magnetic sensor being operable to output a third analog signal in response to a synchronous movement of said target with the object.

7. The magnetic incremental motion detection system of claim 6 further comprising a housing wherein said first magnetic sensor, and said second magnetic sensor are adjacently disposed therein.

8. A magnetic incremental motion detection system for outputting a plurality of signals as a collective representation of an incremental movement of an object, said magnetic incremental motion detection system comprising:

a first means for synchronously moving with the object;

a second means for outputting a first analog signal having a first duty cycle in response to said first means synchronously moving with the object;

a third means for outputting a second analog signal having a second duty cycle in response to said first means synchronously moving with the object, wherein said first duty cycle and said second duty cycle are identical, and wherein said second analog signal is consistently out of phase by a same degree with said first analog signal;

a fourth means for outputting a first digital signal having said first duty cycle in response to said first analog signal; and a fifth means for outputting a second digital signal having said second duty cycle in response to said second analog signal, wherein said second digital signal is consistently out of phase by said same degree with said first digital signal.

9. A magnetic incremental motion detection system for outputting a plurality of signals as a collective representation of an incremental movement of an object, said magnetic incremental motion detection system comprising:

a first means for synchronously moving with the object;

a second means for outputting a first analog signal having a first duty cycle in response to said first means synchronously moving with the object;

a third means for outputting a second analog signal having a second duty cycle in response to said first means synchronously moving with the object, wherein said first duty cycle and said second duty cycle are identical, and wherein said second analog signal is consistently out of phase by a same degree with said first analog signal; and a fourth means for outputting a third analog signal having a third duty cycle in response to said first means synchronously moving with the object.

10. The magnetic incremental motion detection system of claim 9 wherein said third duty cycle is identical to said first duty cycle and to said second duty cycle, and wherein said third digital signal is consistently out of phase by said same degree with said second digital signal.

11. The magnetic incremental motion detection system of claim 9 further comprising a housing wherein said second means, said third means, and said fourth means are adjacently disposed therein.

12. A magnetic incremental rotational motion detection system for outputting a plurality of signals as a collective representation of an incremental movement of an object, said magnetic incremental motion detection system comprising:

a first means for synchronously rotating with the object;

a second means for outputting a first analog signal having a first duty cycle in response to said first means synchronously rotating with the object;

a third means for outputting a second analog signal having a second duty cycle in response to said first means synchronously rotating with the object, wherein said first duty cycle and said second duty cycle are identical, and wherein said second analog signal is consistently out of phase by a same degree with said first analog signal;

a fourth means for outputting a first digital signal having said first duty cycle in response to said first analog signal; and a fifth means for outputting a second digital signal having said second duty cycle in response to said second analog signal, wherein said second digital signal is consistently out of phase by said same degree with said first digital signal.

13. A magnetic incremental rotational motion detection system for outputting a plurality of signals as a collective representation of an incremental movement of an object, said magnetic incremental motion detection system comprising:

a first means for synchronously rotating with the object;

a second means for outputting a first analog signal having a first duty cycle in response to said first means synchronously rotating with the object;

a third means for outputting a second analog signal having a second duty cycle in response to said first means synchronously rotating with the object, wherein said first duty cycle and said second duty cycle are identical, and wherein said second analog signal is consistently out of phase by a same degree with said first analog signal; and a fourth means for outputting a third analog signal having a third duty cycle in response to said first means synchronously rotating with the object.

14. The magnetic incremental rotational motion detection system of claim 13 wherein said third duty cycle is identical to said first duty cycle and to said second duty cycle, and wherein said third digital signal is consistently out of phase by said same degree with said second digital signal.

15. The magnetic incremental rotational motion detection system of claim 13 further comprising a housing wherein said second means, said third means, and said fourth means are adjacently disposed therein.

* * * * *